Nov. 28, 1950　　　R. A. SUTTON　　　2,531,750
HUB BRAKE FOR BICYCLES AND THE LIKE
Filed Oct. 10, 1947

WITNESS:
Esther M. Stockton

INVENTOR.
Richard A. Sutton
BY
Clinton S. Janes
ATTORNEY

Patented Nov. 28, 1950

2,531,750

UNITED STATES PATENT OFFICE 2,531,750

HUB BRAKE FOR BICYCLES AND THE LIKE

Richard A. Sutton, Alhambra, Calif., assignor to Bendix Aviation Corporation, Elmira Heights, N. Y., a corporation of Delaware Application October 10, 1947, Serial No. 779,121

2 Claims. (Cl. 188—26)

The present invention relates to metallic brake elements and more particularly to brake devices such as coaster brakes for bicycles in which high unit pressures and high temperatures are of common occurrence.

The invention is illustrated in connection with the form of coaster brake disclosed in the patent to Hood 2,410,785, issued November 5, 1946, in which form the invention has been most extensively practiced; but it is not restricted to the specific type of brake illustrated.

It is an object of the present invention to provide a novel treatment for metallic brake members which increases the coefficient of friction between the rubbing surfaces.

It is another object to provide such a treatment which prevents seizing of the rubbing surfaces even though they be subjected to high unit pressures.

It is another object to provide such a treatment which overcomes the effect of glazing or burnishing of the parts due to high pressures and/or temperatures.

It is another object to provide such a treatment which, when used on a brake element of comparatively soft metal working against another brake element of comparatively hard metal, prevents the surface of the soft element from being roughened or torn by the hard element or particles of the soft element adhering to the hard element.

Figure 1:
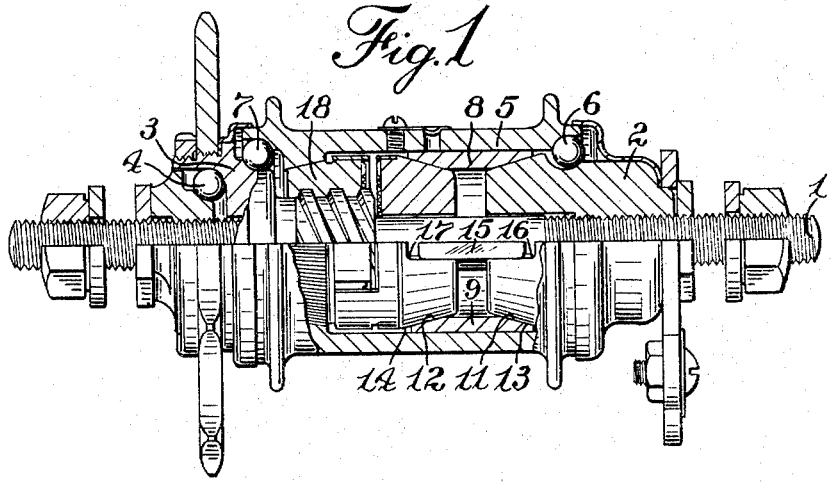
Figure 2:
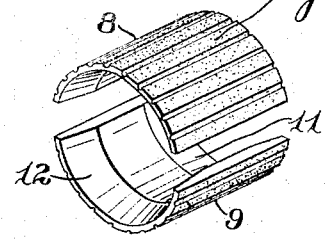

Further objects and advantages will be apparent from the following description taken in connection with the accompanying drawing in which:

Fig. 1 is a side elevation, partly broken away and in section, of a coaster brake suitable for practising the present invention; and Fig. 2 is a detail in perspective of the brake shoes illustrated in Fig. 1, treated in accordance with the invention.

In Fig. 1 of the drawing there is illustrated an axle 1 on which is fixedly mounted an anchor member 2. An actuating member 3 is journaled on the axle 1 by means of a bearing 4, and a wheel hub 5 is rotatably mounted on the anchor and actuating members by means of bearings 6 and 7 respectively. A pair of brake shoes 8, 9 having cylindrical exterior surfaces are loosely mounted in the hub 5 which is provided with a corresponding cylindrical interior surface. The hub 5 is usually formed of a comparatively hard metal such as steel, while the brake shoes 8, 9 are commonly composed of softer metal such as brass.

The interior surfaces of the brake shoes 8, 9 are flared at both ends as indicated at 11, 12 in Fig. 2. The adjacent portion of the anchor member 2 is similarly tapered as shown at 13, and a correspondingly formed expander member 14 is slidably journalled on the axle 1 in position to maintain the brake shoes 8, 9 supported between the expander member and anchor member. Rotation of the expander member 14 and brake shoes 8, 9 is prevented by rectangular keys 15 slidably mounted in mating recesses 16, 17 in the anchor and expander members respectively.

Means for moving the expander member 14 to the right in Fig. 1 so as to expand the brake shoes 8, 9 into frictional engagement with the interior of the hub 5 is provided in the form of a control nut 18 threaded on the actuating member 3 whereby backward rotation of the actuating member causes the control nut to move to the right so as to engage and operate the expander member 14.

It has been found in the operation of brakes having metallic rubbing elements such as here illustrated, that prolonged and severe application of the brake tends to cause the rubbing surfaces to become glazed or burnished so as to reduce the effectiveness of the brake. Sometimes this condition is accompanied by scoring or tearing of the metallic surfaces and by a transfer of particles of metal from one element to the other. When in this condition, the brake may suddenly seize and lock the wheel from rotation.

Applicant has discovered that the above conditions may be obviated by the interposition of a thin film or coating of dry, finely powdered graphite between the rubbing surfaces. Thus a "hard" brake, i. e. one in which energetic actuation produces inadequate effect, if treated in accordance with the present invention will have its original coefficient of friction immediately restored and even enhanced, and the brake actually becomes still more efficient as a result of extended subsequent use.

The preferred manner of carrying out the invention is to disassemble the brake, wipe the rubbing surfaces substantially free from any adherent grease or oil, coat the rubbing surfaces of the brake shoes with finely powdered graphite by dipping or rolling them in the powder, or by dusting it on; blowing off the excess graphite; and re-assembling the brake. If particles of metal from the brake shoes have become embedded in or attached to the interior of the hub, it may be desirable to smooth up the surface of the hub with emery cloth and wipe it clean before reassembly of the brake therein. As above stated, this treatment has been found to immediately change a "hard" brake into a "soft" or easily operated brake, in which the braking effect is substantially a straight-line function of the brake-applying force.

The precise manner in which the graphite operates to thus increase and control the coefficient of friction of the rubbing surfaces is not known. It certainly is not due to its well-known lubricating property, since graphite grease does not give the desired effect. In fact, the application of grease or oil to a perfectly functioning treated brake causes it to revert at once to its hard-braking condition prior to the graphite treatment. It is possible that the graphite acts as a kind of non-abrasive cleaning agent for the rubbing surfaces, insuring proper frictional contact but preventing the molecular engagement which causes scoring and transfer of metal from one brake element to the other. Irrespective of the theory of operation, however, the result, though startlingly contrary to what would be expected from the known properties of graphite is dependable, substantially uniform and highly effective over long periods of use.

I claim:

1. In a vehicle brake a pair of brake members having cooperating rubbing surfaces and means for increasing the coefficient of friction between said surfaces consisting of a thin film of dry finely powdered graphite, free from admixture with any binding, lubricating, or abrasive agent interposed between said surfaces, and without the presence in the brake device of any additional graphite or lubricating material having access to the braking surfaces.

2. In a hub brake for bicycles and the like, a pair of cooperating brake members having metallic friction surfaces of unequal hardness, and means for increasing the coefficient of dry friction between said surfaces, consisting of a thin coating of dry, finely powdered graphite on one of said surfaces, free from admixture with any binding, lubricating or abrasive agent, and without the presence in the brake device of any additional graphite or lubricating material having access to the braking surfaces.

RICHARD A. SUTTON.

REFERENCES CITED

The following references are of record in the file of this patent:

UNITED STATES PATENTS

| Number | Name | Date |
|---|---|---|
| 995,067 | Jones | June 13, 1911 |
| 1,271,424 | Brush | July 2, 1918 |
| 1,670,224 | Watson | May 15, 1928 |
| 2,381,941 | Wellman et al. | Aug. 14, 1945 |
| 2,410,785 | Hood | Nov. 5, 1946 |